April 30, 1968   J. B. MURTLAND, JR., ET AL   3,381,079
ELECTRODE REGULATING SYSTEMS FOR ARC MELTING FURNACES
Filed Sept. 18, 1964   2 Sheets-Sheet 1
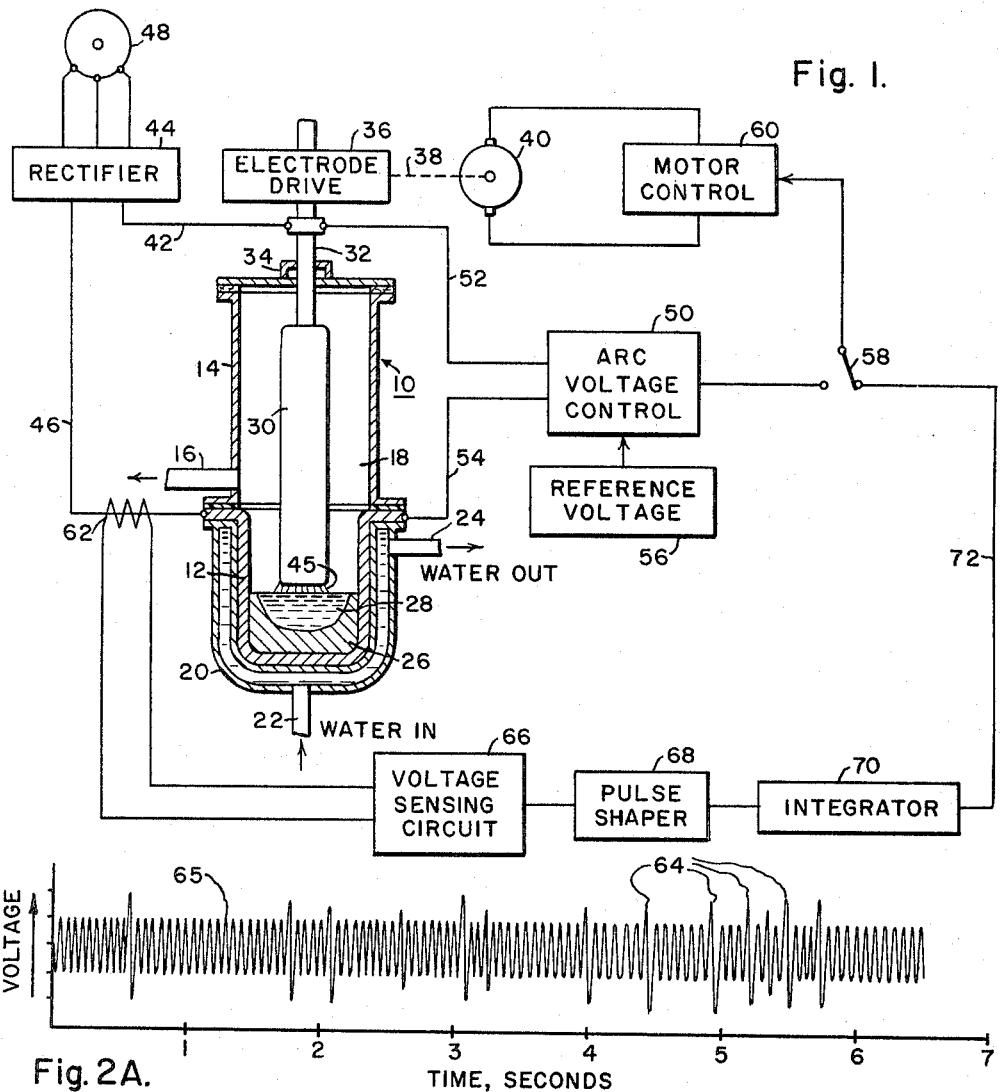
Fig. 1.
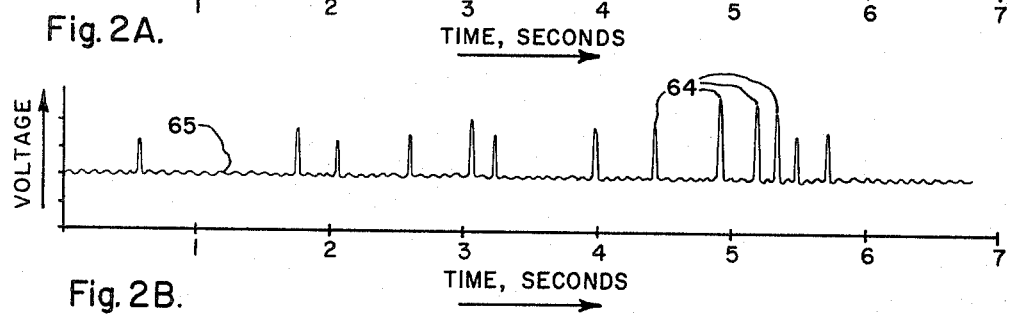
Fig. 2A.
Fig. 2B.
INVENTOR.
JAMES B. MURTLAND JR., HAROLD S. JACKSON
and CHARLES F. REBHUN
BY
ATTORNEY April 30, 1968 J. B. MURTLAND, JR., ET AL 3,381,079
ELECTRODE REGULATING SYSTEMS FOR ARC MELTING FURNACES
Filed Sept. 18, 1964 2 Sheets-Sheet 2

INVENTOR.
JAMES B. MURTLAND JR., HAROLD S. JACKSON
and CHARLES F. REBHUN
BY
ATTORNEY United States Patent Office 3,381,079
Patented Apr. 30, 1968

3,381,079
ELECTRODE REGULATING SYSTEMS FOR
ARC MELTING FURNACES
James B. Murtland, Jr., Natrona Heights, Pa., Harold S. Jackson, Troy, N.Y., and Charles F. Rebhun, Natrona Heights, Pa., assignors to Allegheny Ludlum Steel Corporation, Brackenridge, Pa., a corporation of Pennsylvania
Filed Sept. 18, 1964, Ser. No. 397,589
7 Claims. (Cl. 13—13)

ABSTRACT OF THE DISCLOSURE

Control system for direct current consumable electrode furnaces based upon the detection of discontinuities (i.e., pulses) in the arc voltage, and in particular a control system of the type described wherein the discontinuities are detected by means of an inductive coil positioned in inductive relation with respect to a conductor which carries the arc current to the arc gap, or a conductor in which arc currents are inductively induced.

---

As is known, consumable arc melting furnaces usually comprise an electrode of the metal to be melted extending downwardly into a mold or crucible which receives the molten metal and within which an ingot is formed. The electrode is connected to one terminal of a direct current voltage source, and means are provided for electrically connecting the other terminal of the source to the mold and, hence, to the molten metal. Usually in starting the melt, a small supply of chips or the like is placed in the mold so that when the arc is struck such chips are melted to form an initial molten metal supply in the crucible mold; and as the arc is maintained between the electrode to be melted and the molten pool of metal beneath it, the end of the electrode is melted due to the heat of the arc. As the electrode is melted, it is deposited in and forms the aforesaid molten pool, the bottom portion of which continuously solidifies as the electrode melts to form an ingot which increases in length, starting from the bottom upwardly. In this process, impurities float to and on the top of the molten pool; and assuming that the pool does not solidify during the formation of the ingot, the major portion of the impurities will be excluded from the main body of the ingot.

As the electrode melts, it is necessary to move it downwardly to maintain an arc gap of the desired length between the bottom of the electrode and the molten pool beneath it. An arc gap of too short a length will result in shorting between the electrode and the molten pool; whereas a gap which is too long will not support the arc. Between these upper and lower limits is an optimum gap length where the melting procedure will be more or less uniform to produce the desired characteristics in the resulting ingot.

In the past, most systems for maintaining the desired arc gap have relied upon arc voltage (i.e., the voltage gradient across the gap) for regulating purposes. That is, the arc voltage, or approximation thereof, was detected and this voltage used to drive a motor which raised or lowered the electrode, as the case may be, in an effort to maintain the arc gap at a desired length. However, apparatus for regulating the position of the electrode which relies upon arc voltage for regulating purposes is not completely satisfactory since there is only a small change of arc voltage with arc gap length in the range of gap lengths normally used. Furthermore, the voltage drop across the arc is influenced by variables other than the length of the arc such as the pressure within the mold which may change abruptly upon the liberation of gases in the melting process. In addition, the arc voltage usually cannot be measured directly, and when the control voltage is derived from terminals connected to the electrode and the mold, such control voltage is affected by the voltage drops through the contacts, both of which may vary during the melting of the metal. Consequently, if the electrode is positioned so that a constant voltage is maintained between the electrode support and the molten metal, the length of the arc gap is not necessarily or consistently within the desired range. Still another difficulty experienced in attempting to control the position of the electrode as a function of the arc voltage is complete or partial shorting of the arc. This condition is usually associated with arc instability; and although all of the factors contributing to shorting are not entirely understood, it is apparent that this condition makes the arc voltage control method somewhat unsatisfactory.

In U.S. Patent No. 3,187,078 issued June 1, 1965 and assigned to the assignee of the present application, an arc gap control system is described which regulates the arc gap as a function of an electrical quantity previously unknown. Specifically, it was found that superimposed on the base arc gap voltage are voltage discontinuities in the form of pulses, each of which represents a momentary increase in the impedance across the gap and persists for a short time such as 40 milliseconds. Characteristically, these arc voltage discontinuities occur in groups or bunches at a frequency or repetition rate of below about 30 cycles per second which is the minimum frequency of any ripple content in the direct current voltage. Above a certain arc voltage (i.e., wide arc gap) and immediately after some arc disturbances such as a short, the voltage discontinuities do not occur; however as the arc length is decreased, the discontinuities appear at what is believed to be optimum operating conditions. Surprisingly enough, and in contrast to what might be expected, these voltage discontinuities may be used in a servo system for controlling the arc gap.

Thus, it has been found that the voltage across the arc actually consists of two components. The first component may be termed the "base voltage" which is comprised of an anode voltage drop, plasma voltage drop and the cathode voltage drop. On an instantaneous basis, the change in this base voltage with a change in arm length is usually referred to as the voltage gradient of the arc plasma. The second component of arc voltage, for want of a better name, may be termed "hash" which comprises the voltage discontinuities mentioned above. In the specification which follows, these discontinuities, which result from momentary increases in the impedance across the gap, are referred to as 'hash" pulses. It has been found that the presence or absence of these pulses has a substantial effect upon the melt rate, with very little change in apparent input power to the furnace. When the hash pulses are present during melting, the melt rate is found to be higher. It is thought that this is caused probably by out-gassing of the metals during melting with a resulting increase of pressure in the melting chamber; and it is possible that the hash is an indication of a confinement of the arc to an area between the electrode and the molten pool such that radiation to the surrounding crucible walls is minimized and the heat flow out of the melt area held to a minimum. Where melting is accomplished in the absence of the hash condition and at a substantially constant arc voltage, a relatively uniform melt rate is also obtained but at a much lower rate than that obtained with the hash present. Furthermore, with hash present, the melt rate can be increased without an appreciable increase in power input; and under certain conditions power input actually appears to decrease with an increased melt rate when hash is present. Thus, it can be theorized that the presence of hash indicates optimum operating conditions.

Although the foregoing discussion has been more or less limited to the voltage discontinuities resulting from momentary increases in the impedance across the arc, it should be understood that the impedance increases give rise to other fluctuations in an electrical characteristic of the arc gap, such as current discontinuities, which can be used for purposes of control. The current discontinuities, for example, comprise decreases in arc current which can be used in a control system in the same manner as the hash pulses. Thus, periodic increases in the impedance of the arc will occur in synchronism with the occurrence of each increasing voltage pulse and decreasing current pulse.

In consumable electrode arc furnaces, the melting power is supplied by means of a three-phase alternating current generator, the output of which is rectified. The rectified direct current voltage applied to the furnace, therefore, contains a ripple content at a frequency usually above about 30 cycles per second. As mentioned above, however, the hash pulses have a frequency below 30 cycles per second. It is, therefore, possible to separate the hash pulses from the ripple content in a conventional L-C filter, and to use only the filtered pulses for purposes of control.

While conventional filter techniques are satisfactory for separating the hash content from the ripple, it may be undesirable in certain cases to employ such techniques. Accordingly, as an overall object, the present invention provides a hash control system for a consumable electrode furnace wherein a conventional filter circuit is not necessary for separating the hash content from the ripple content of the arc voltage.

Another object of the invention is to provide means for detecting the voltage discontinuities known as hash in a consumable electrode arc furnace without a direct electrical connection between the control apparatus and the power supply circuit for the furnace.

In accordance with the invention, an inductive coil is positioned in inductive relation with respect to a conductor which carries the arc current to the arc gap or a conductor in which arc currents are inductively induced. This inductive pickup may be a coil wound around the water jacket, or any portion of the arc current supply system such as a bus bar, the electrode, or even the ram through which the arc current is conducted. It will be appreciated that the magnitude of a signal obtained from such an inductive member is dependent upon the number of turns of the inductive member and the rate of change of the flux through the member. That is, the voltage induced in a coil placed in the field of a current-carrying member is proportional to the number of turns of the coil times the rate of change with time of the flux through the coil. Since the voltage discontinuities comprising hash produced a much higher rate of change in flux with time than the normal power supply ripple, the signal as measured by such a coil accentuates the presence of the hash and suppresses the normal periodic variations in the direct current power supply. The signal derived across the inductive pickup, therefore, can be used for purposes of control in an electrode control system similar to that shown in the aforesaid U.S. Patent No. 3,187,078.

The above and other objects and features of the invention will become apparent from the following detailed description taken in connection with the accompanying drawings which form a part of this specification, and in which:

FIGURE 1 is a schematic illustration of one embodiment of the invention wherein an inductive pickup surrounds one of the power leads connected to the consumable electrode furnace;

FIGS. 2A and 2B are graphs illustrating arc voltage as it appears across the arc gap, and as it appears across the inductive pickup of the invention, respectively.

Figure 3:
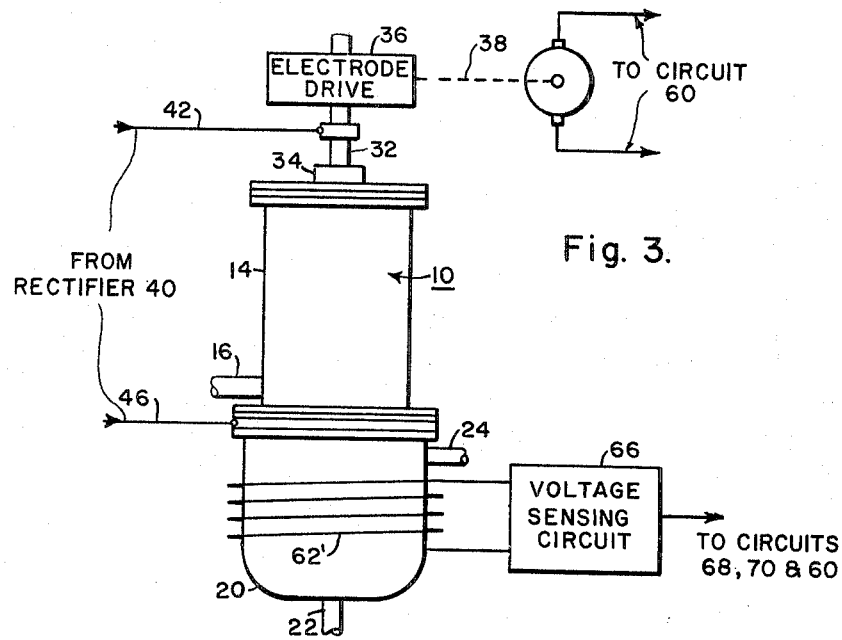
FIG. 3 is an illustration of another embodiment of the invention wherein the inductive pickup is wrapped around the water jacket of the consumable electrode furnace.

Referring now to the drawings, and particularly to FIG. 1, a consumable electrode arc furnace is schematically illustrated and identified by the reference numeral 10. The furnace comprises a conductive mold or crucible 12 which may, for example, be fabricated of copper. Covering the upper open end of the mold 12 is a gas-tight housing 14 having a connection at 16 to means, not shown, for evacuating the chamber 18 formed by the mold 12 and the housing 14 covering it. Alternatively, the chamber 18 could be filled with an inert gas; however in either case the metal to be melted is protected from oxidation. Surrounding the mold 12 is a water jacket 20 having inlet and outlet ports 22 and 24 connected thereto.

The mold 12 contains an ingot 26 which is formed from a molten pool 28 adjacent the lower end of an electrode 30 of the metal to be melted. Electrode 30 extends upwardly from the mold 12 and is connected at its upper end to a reciprocable rod or electrode ram carrier 32 which extends through a seal 34 in the housing 14. The ram 32 is connected to a suitable drive which may be either mechanical or hydraulic. In this specific embodiment, the electrode drive 36 comprises a rack and pinion or worm and screw arrangement connected through shaft 38 to a drive motor 40, the arrangement being such that as the motor 40 is rotated in one direction, the ram 32 and electrode 30 carried thereby will move upwardly; whereas rotation of the motor 40 in the opposite direction will cause downward movement of the electrode 30. Connected to the ram 32 is a lead 42, also connected to the negative terminal of a three-phase rectifier 44. In a similar manner, the mold 12 is connected through lead 46 to the positive terminal of the rectifier 44. The rectifier 44 is supplied with three-phase alternating current power from an alternator 48, substantially as shown.

With the arrangement shown, the direct current power supplied via leads 42 and 46 will cause an arc 45 to be struck between the lower end of the electrode 30 and the bottom of the mold 12, thereby forming heat which progressively melts the end of the electrode and causes the formation of the aforesaid molten pool 28. As electrode 30 is melted it is, of course, necessary to move it downwardly by means of the motor 40 and electrode drive 36 in order to maintain the desired arc gap.

As was mentioned above, it has been the practice to attempt to control the position of the electrode 30 to maintain the desired arc gap by using the arc gap voltage (i.e., the voltage gradient across the gap) as it appears between the electrode 30 and ingot 26. Such control apparatus is schematically illustrated in FIG. 1 and in its simplest form comprises an arc voltage control circuit 50 connected through leads 52 and 54 to the electrode 30 and the mold 12, respectively. In circuit 50 the arc gap voltage is compared with a reference voltage from source 56; and assuming that switch 58 is reversed with respect to the position shown in FIG. 1, the difference voltage is applied to motor control circuit 60 to raise or lower the electrode 30, as the case may be. That is, if the arc voltage should fall, the arc gap is theoretically decreasing. Therefore, the circuit 50 will apply a voltage to motor control circuit 60 to cause motor 40 to raise the electrode 30. Similarly, if the arc voltage should rise, the arc gap is theoretically widening, and the circuit 50 will apply a signal to motor control circuit 60 to cause motor 40 to lower the electrode 30.

As was explained above, the system just described for controlling the arc gap as a function of arc gap voltage is not completely satisfactory since, among other reasons, there is only a small change of arc voltage with arc gap length in the range of gap lengths normally used. The present invention comprises an improvement in a consumable electrode furnace control system such as that shown in the aforesaid U.S. Patent No. 3,187,078 wherein voltage discontinuities known as "hash" are employed for purposes of control. The system shown in that application employs a filter connected to the leads 52 and 54, for example, for the purpose of separating the voltage discontinuities comprising hash from the ripple content in the direct current voltage supplied from rectifiers 44. This ripple content usually has a frequency of about 360 cycles per second. In the present invention, on the other hand, the voltage discontinuities comprising hash are sensed by means of an induction coil 62 capable of differentiating between the hash pulses and the ripple content. This can best be explained by reference to FIGS. 2A and 2B. FIG. 2A illustrates arc voltage as it appears across leads 52 and 54, while FIG. 2B illustrates a wave form comprising the voltage induced in coil 62. As is mentioned above, the hash comprises voltage discontinuities or pulses 64 superimposed on the base arc voltage, each of which pulses persist for about 40 milliseconds. Characteristically, the voltage discontinuities or pulses 64 occur in bunches as shown. Also superimposed on the base arc voltage as shown in FIG. 2A are ripple pulses 65 of much greater frequency, but which have a rate of rise less than the rate of rise of the hash pulses 64. This factor is utilized to distinguish the hash pulses from the ripple content with the use of the coil 62. In this respect, it will be remembered that the voltage induced in a coil is represented by the equation:

$$e = -N\frac{d\theta}{dt}$$

where
  $e$ is the instantaneous voltage,
  $N$ is the number of turns in coil, and
  $\theta$ is the flux in webbers.

Consequently, it can be seen that the voltage induced in the coil 62 is dependent not only upon the number of turns in the coil, but also upon the rate of change in flux. This, in turn, is dependent upon the rise rate of the hash and ripple pulses; and since the rise rate of the hash pulses 64 is much greater than the ripple pulses, the voltage pulses induced in the coil due to the hash will be much greater in magnitude than those induced due to the ripple pulses. This is clearly illustrated in FIG. 2B. The wave form of FIG. 2B is applied, as shown in FIG. 1, to a voltage sensing circuit 66 which may, for example, comprise a type of clipper which distinguishes between the hash pulses 64 of larger amplitude and the ripple pulses 65 of lower amplitude. After passing through the voltage sensing circuit 66, the hash pulses are passed through a pulse shaper 68 and thence to an integrator 70 which produces a steady-state output voltage on lead 72 which, when switch 58 is in the position shown, is applied to the motor control circuit 60. The details of the hash control system including circuits 66, 68 and 70, as well as other and different control systems utilizing hash as a control parameter, may be had by reference to the aforesaid U.S. Patent No. 3,187,078.

With reference, now to FIG. 3, another embodiment of the invention is shown in which an induction coil 62' surrounds the water jacket 20 for the mold 12. Aside from this, however, the circuitry is the same as that of FIG. 1 and is, consequently, not repeated in FIG. 3. The terminals of the coil 62' will be connected to a voltage sensing circuit 66 in a manner similar to FIG. 1 such that the hash pulses can be used to control the position of the electrode 30. For that matter, the inductive pickup coil can be inductively coupled to any part of the apparatus through which the arc current flows, or in which variations in the arc current are inductively induced.

Although the invention has been shown in connection with certain specific embodiments, it will be readily apparent to those skilled in the art that various changes in form and arrangement of parts may be made to suit requirements without departing from the spirit and scope of the invention.

We claim as our invention:
1. In combination, a consumable electrode furnace of the type in which an arc is struck and arc current flows between a consumable electrode and a molten pool of metal beneath it by application of a direct current potential between the electrode and a mold within which the molten pool is formed, induction coil means inductively coupled to a member associated with said furnace and through which said arc current flows, said induction coil means being such that recurring fluctuations in the direct arc current indicative of the position of said electrode with respect to the molten pool will be induced therein, and apparatus including a pulse integrator responsive to said recurring fluctuations for controlling the position of the electrode with respect to said molten pool.

2. In combination, a consumable electrode furnace of the type in which an arc is struck and arc current flows between a consumable electrode and a molten pool of metal beneath it by application of a direct current potential between the electrode and a mold within which the pool is formed, said direct current potential being derived by rectifying an alternating current potential, induction coil means inductively coupled to a member associated with said furnace and through which said arc current flows, said induction coil means being such that recurring fluctuations in the direct arc current occurring at a frequency beneath that of any ripple in the direct arc current will be induced in the induction coil means at a magnitude greater than any induced ripple, and apparatus responsive only to said recurring fluctuations induced in the coil for controlling the position of the electrode with respect to said molten pool.

3. In combination, a consumable electrode furnace of the type in which an arc is struck and arc current flows between a consumable electrode and a molten pool of metal beneath it by application of a direct current potential between the electrode and a mold within which the pool is formed, the direct current potential being derived by rectifying an alternating current potential, an induction coil inductively coupled to a member associated with said furnace and through which said arc current flows, the induction coil being such that the voltages induced therein due to pulses recurring at frequencies beneath any ripple in the arc current will be greater than those induced due to ripple, and apparatus including a pulse shaper responsive to voltages induced in said induction coil for controlling the position of the electrode with respect to said molten pool.

4. The combination of claim 3 wherein voltage pulses induced in said coil at frequencies beneath the ripple-content are due to momentary increases in the impedance across said arc.

5. In combination, a consumable electrode furnace of the type in which an arc is struck and arc current flows between a consumable electrode and a molten pool of metal beneath it by application of a direct current potential between the electrode and a mold within which the pool is formed, a source of alternating current voltage, means for rectifying said source of alternating current voltage, electrical conductors connecting said rectifying means to said electrode and said mold respectively, induction coil means inductively coupled to at least one of said electrical conductors, control apparatus for maintaining the arc gap between the electrode and the molten pool within a desired range, and means for applying voltages induced in the induction coil means to said control apparatus.

6. The combination of claim 5 wherein said induction coil means comprises an induction coil and wherein the induction coil is such that voltages induced therein due to discontinuities in the arc current recurring at a frequency beneath any ripple content in the arc current flowing through said conductors will be greater in magnitude than the voltages induced therein at higher frequencies.

7. In combination, a consumable electrode furnace of the type in which an arc is struck and arc current flows between a consumable electrode and a molten pool of metal beneath it by application of a direct current potential between the electrode and a mold within which the pool is formed, the direct current potential being derived by rectifying an alternating current voltage, an induction coil surrounding said mold whereby recurring fluctuations in the arc current will be induced in the induction coil, and apparatus including a pulse integrator responsive to said recurring fluctuations for controlling the position of the electrode with respect to said molten pool.

References Cited

UNITED STATES PATENTS

| | | | |
|---|---|---|---|
| 3,139,473 | 6/1964 | Morris | 13—13 |
| 3,229,148 | 1/1966 | Moore | 13—13 |

BERNARD A. GILHEANY, *Primary Examiner.*

R. N. ENVALL, JR., *Assistant Examiner.*